United States Patent
Al Essa

(10) Patent No.: US 12,385,576 B2
(45) Date of Patent: Aug. 12, 2025

(54) SMART BACK PRESSURE VALVE AND METHODS OF USE

(71) Applicant: SAUDI ARABIAN OIL COMPANY, Dhahran (SA)

(72) Inventor: Abdulrahman Anwar Al Essa, Dammam (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 210 days.

(21) Appl. No.: 18/310,576

(22) Filed: May 2, 2023

(65) Prior Publication Data
US 2024/0369157 A1   Nov. 7, 2024

(51) Int. Cl.
*G01M 3/28* (2006.01)
*F16K 37/00* (2006.01)

(52) U.S. Cl.
CPC ....... *F16K 37/0091* (2013.01); *G01M 3/2876* (2013.01)

(58) Field of Classification Search
CPC .......................... G01M 3/2876; F16K 37/0091
See application file for complete search history.

(56) References Cited

U.S. PATENT DOCUMENTS

| | | | | |
|---|---|---|---|---|
| 4,274,438 A * | 6/1981 | La Coste | ............. | G01L 5/0061 91/1 |
| 4,766,765 A * | 8/1988 | Ezekoye | ............. | G01M 3/2876 73/1.72 |
| 5,174,321 A * | 12/1992 | Danzy | ............. | F16K 37/0091 137/489 |
| 5,856,615 A * | 1/1999 | Easter | ............. | F16K 37/0091 73/1.72 |
| 7,146,844 B2 * | 12/2006 | Hyme | ............. | F15B 19/002 73/1.72 |
| 8,539,976 B1 * | 9/2013 | Rodgers, Jr. | ............. | F16K 15/066 137/512 |
| 2021/0341078 A1 * | 11/2021 | Kalyanasundaram | | F16K 17/087 |
| 2024/0318745 A1 * | 9/2024 | Stokke | ............. | G01M 3/2876 |

\* cited by examiner

*Primary Examiner* — Alexander A Mercado
(74) *Attorney, Agent, or Firm* — Vorys, Sater, Seymour and Pease LLP

(57) ABSTRACT

A smart back pressure valve includes a valve body having opposing upper and lower ends, and a pressure testing system extending from the lower end of the valve body and including a pressure housing defining an interior at least partially filled with a compressible fluid, a piston axially translatable within the interior and including a piston head, and a piston rod extending distally from the piston head, a motor operatively coupled to the piston rod and operable to drive the piston toward and away from the valve body, and a pressure gauge assembly that monitors a pressure within the interior. As the motor advances within the interior, the compressible fluid is compressed and increases the pressure within the interior. When the pressure gauge assembly reports that the pressure remains stable after a predetermined time interval, that is a positive indication that the valve body properly holds pressure.

18 Claims, 6 Drawing Sheets

SMART BACK PRESSURE VALVE AND METHODS OF USE

FIELD OF THE DISCLOSURE

The present disclosure relates generally to oil and gas tubing valves and, more particularly, to a smart back pressure valve for post-installation wellhead pressure testing.

BACKGROUND OF THE DISCLOSURE

Throughout the lifetime of an oil and gas well, proper sealing and pressure isolation equipment is required to prevent undesirable fluid flow out of the system, including oil, gas, injection fluids, and formation water. One common mechanical barrier utilized in sealing the wellhead of an oil and gas well is a back pressure valve, which is typically secured within a tubing hanger arranged within a tubing head adapter, which forms part of the wellhead. A production tree (alternately referred to as a "Christmas tree") is commonly attached to the top of the tubing head adapter to control flow into and out of the wellbore.

The back pressure valve operates as a one-way check valve designed to isolate well pressure from below while enabling at least a small amount of fluid flow from above; i.e., from the Christmas tree. Conventional back pressure valves, however, are not able to be pressure tested from below following installation since there are typically no pump inlets to pressure test from the tubing-casing annulus. Pressure testing after installation may enable confirmation of proper installation and operation of the back pressure valve to prevent upward flow from within the wellbore. Therefore, without the ability to pressure test a back pressure valve after installation, the back pressure valve may not be used with confidence in a live well.

Accordingly, a back pressure valve which can be pressure-tested once installed within a tubing hanger and wellhead is desirable.

SUMMARY OF THE DISCLOSURE

Various details of the present disclosure are hereinafter summarized to provide a basic understanding. This summary is not an exhaustive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

According to an embodiment in accordance with the present disclosure, a smart back pressure valve includes a valve body having opposing upper and lower ends, and a pressure testing system extending from the lower end of the valve body and including a pressure housing defining an interior at least partially filled with a compressible fluid, a piston axially translatable within the interior and including a piston head, and a piston rod extending distally from the piston head, a motor operatively coupled to the piston rod and operable to drive the piston toward and away from the valve body, and a pressure gauge assembly that monitors a pressure within the interior. As the motor advances within the interior, the compressible fluid is compressed and increases the pressure within the interior. When the pressure gauge assembly reports that the pressure remains stable after a predetermined time interval, that is a positive indication that the valve body properly holds pressure.

In a further embodiment, a method of testing a back pressure valve includes installing the back pressure valve in a tubing hanger of a wellhead, the back pressure valve including a valve body having opposing upper and lower ends, and a pressure testing system extending from the lower end of the valve body, the pressure testing system providing a pressure housing defining an interior at least partially filled with a compressible fluid, a piston axially translatable within the interior and including a piston head that forms a seal against an inner wall of the pressure housing, and a piston rod extending distally from the piston head, a motor operatively coupled to the piston rod, and a pressure gauge assembly. The method further includes operating the motor and thereby driving the piston toward the valve body, compressing the compressible fluid within the interior as the piston moves toward the valve body, monitoring and reporting a pressure within the interior with the pressure gauge assembly, and providing a positive indication that the valve body properly holds pressure when the pressure gauge assembly reports that the pressure remains stable after a predetermined time interval.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

DETAILED DESCRIPTION

Figure 1A:
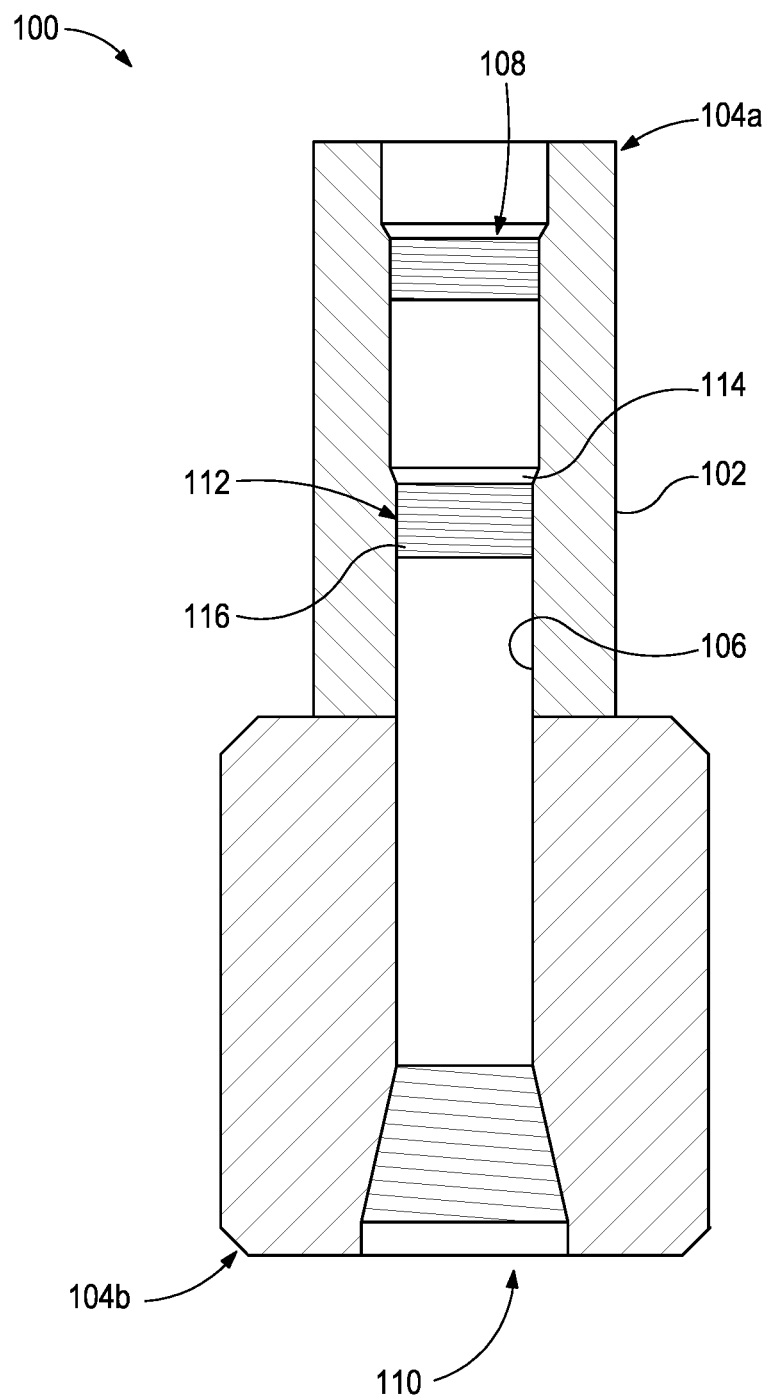
FIG. 1A is a cross-sectional side view of an example tubing hanger.

Embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

Embodiments in accordance with the present disclosure generally relate to oil and gas tubing valves and, more particularly, to smart back pressure valves capable of post-installation wellhead pressure testing. The disclosed embodiments may enable pressure testing of a back pressure valve while installed within a tubing hanger and corresponding wellhead without the need for additional equipment, flow paths, or modifications to the existing wellhead infrastructure. The smart back pressure valves described herein may enable remote actuation of pressure testing, as well as remote monitoring of one or more integrated pressure gauges. The smart back pressure valves described herein may further include actuatable, deformable, or shearable components to enable downward flow past the pressure testing apparatus following confirmation of correct installation. As such, the pressure testing apparatus may remain in place or be subsequently removed without interrupting operation of the back pressure valve and wellhead system.

FIG. 1A is a cross-sectional side view of an example tubing hanger 100, which may be used in accordance with the principles of the present disclosure. The tubing hanger 100 may include a solid, elongate body 102 having a first or "uphole" end 104a and a second or "downhole" end 104b opposite the uphole end 104a. An interior channel 106 is defined within the body 102 and extends between the uphole and downhole ends 104a,b. The tubing hanger 100 may be installed within a tubing head adapter (not shown) that forms part of a wellhead (not shown), and a production tree (or "Christmas tree") may be secured atop the tubing head adapter.

The tubing hanger 100 may include or define a landing joint profile 108 within the interior channel 106 at or near the uphole end 104a. The landing joint profile 108 provides a landing shoulder and threaded interface used to attach, or latch to, a running tool in order to run a tubing string during the drilling or completion running phases of the well's operational life. The tubing hanger 100 may also include or define a tubing profile 110 within the interior channel 106 at or near the downhole end 104b. The tubing profile 110 may be configured to mate with or otherwise couple to tubing extending below, such as production tubing. In some embodiments, the tubing profile 110 includes tapered threads for mating with the tubing. In alternate embodiments, an adapter pipe may be utilized for connection between the tubing profile 110 and the tubing.

The tubing hanger 100 may further include or define a back pressure valve profile 112 within the interior channel 106 at a location between the uphole and downhole ends 104a,b. The back pressure valve profile 112 is configured to receive and mate with a back pressure valve operable to control fluid flow through the tubing hanger 100. As illustrated, the back pressure valve profile 112 may include or define a landing shoulder 114 and internal threads 116. The landing shoulder 114 may be configured to receive an opposing shoulder provided on the back pressure valve, and the internal threads 116 may be configured to threadably mate with external threads provided on the exterior of the back pressure valve.

The back pressure valve profile 112 may be used to receive and mate with traditional or conventional back pressure valves commonly used in oil and gas wellhead installations. As described herein, however, the back pressure valve profile 112 may also be used to receive and mate with a smart back pressure valve. Accordingly, in at least one embodiment, the tubing hanger 100 may comprise a traditional or conventional tubing hanger 100 forming part of a traditional or conventional wellhead, but is capable of accommodating the embodiments of the smart back pressure valves described herein.

Figure 1B:
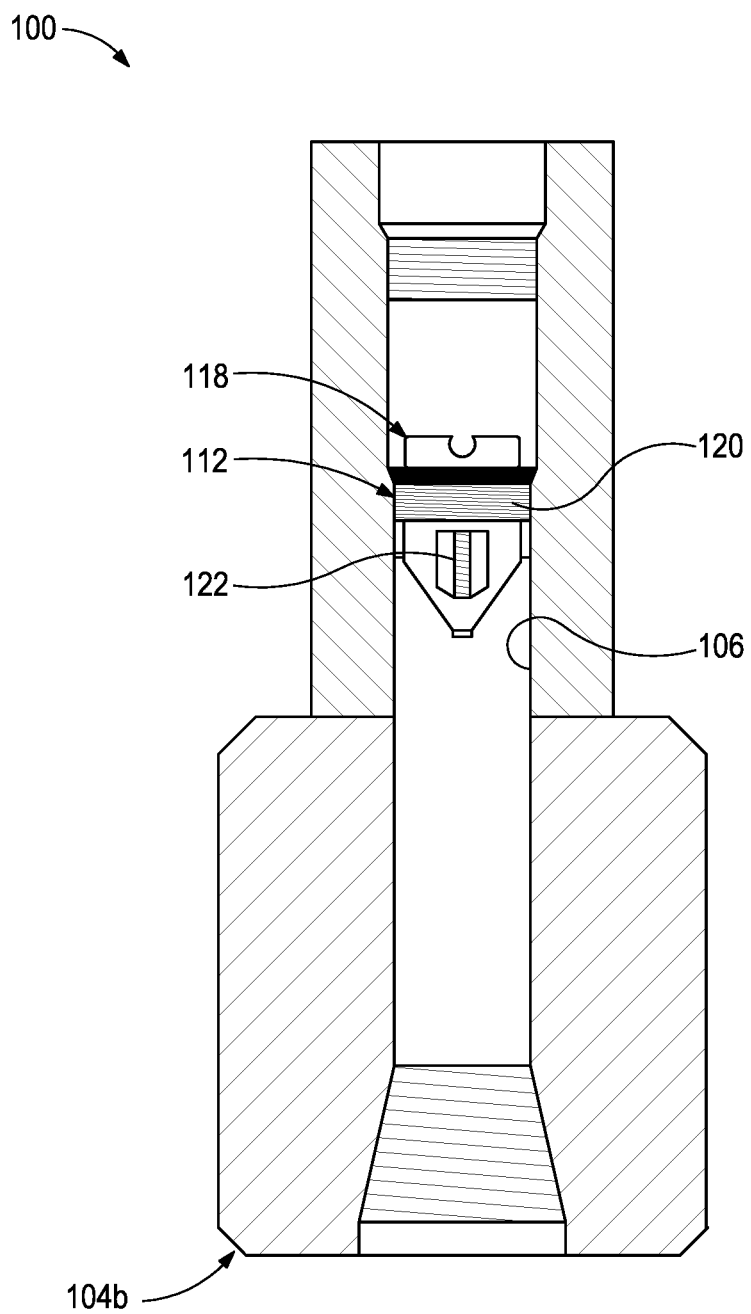
FIG. 1B is a cross-sectional side view of an example tubing hanger with a pressure valve installed.

FIG. 1B is a cross-sectional side view of the tubing hanger 100 with a prior art or conventional back pressure valve 118 installed therein. As illustrated, the back pressure valve 118 may include external threads 120 configured to threadably mate with the internal threads 116 (FIG. 1A) provided by the back pressure valve profile 112, such that the back pressure valve 118 may be retained within the interior channel 106 during fluid flow or any other applied load.

The back pressure valve 118 may also include an actuatable valve element 122 operable to move between closed and open positions and thereby prevent or allow fluid flow through the back pressure valve 118. In some applications, the actuatable valve element 122 may comprise a poppet valve that enables unidirectional flow from above while preventing back flow from below. The actuatable valve element 122 may be spring-loaded such that the back pressure valve 118 is held closed until pressure forces overcome the spring forces of the actuatable valve element 122. More specifically, the back pressure valve 118 is oriented within the tubing hanger 100 such that the actuatable valve element 122 will compress (open) after a large enough force is applied from above the back pressure valve 118, such that flow from above may pass through the back pressure valve 118 and through the interior channel 106. Once the pressure above the back pressure valve 118 is reduced, the actuatable valve element 122 is naturally biased back to the closed position via spring force of the actuatable valve element 122, thus maintaining a closed back pressure valve 118.

The inside diameter of the actuatable valve element 122 is smaller than the diameter of the interior channel 106. Further, the valve face, or "poppet" may include an elastomer seal (not shown) which may ensure proper sealing within the body of the back pressure valve 118. Following installation of the back pressure valve 118 within the interior channel 106 of the tubing hanger 100, the back pressure valve 118 may require modifications to the hanger 100, the wellhead (not shown) or the tubing further downhole to verify proper installation and operation of the back pressure valve 118. As installed, the back pressure valve 118 acts as a one-way barrier to flow rising from below while enabling at least a small amount of flow from above.

Without any system modifications, the seal generated by the back pressure valve 118 cannot be tested or confirmed until formation fluids rise from below during active operation. In the event of errors in installation or manufacturing of the back pressure valve 118, the one-way barrier may fail during active operation and may lead to a blowout event or equipment damage. According to embodiments of the present disclosure, conventional back pressure valves, such as the back pressure valve 118, may be replaced with a smart back pressure valve. The smart back pressure valve may be similar in some respects to conventional back pressure valves, except the smart back pressure valve may be designed to apply fluid pressure from below to test the installation and integrity of the smart back pressure valve and thereby confirm whether a proper seal has been made.

Figure 2:
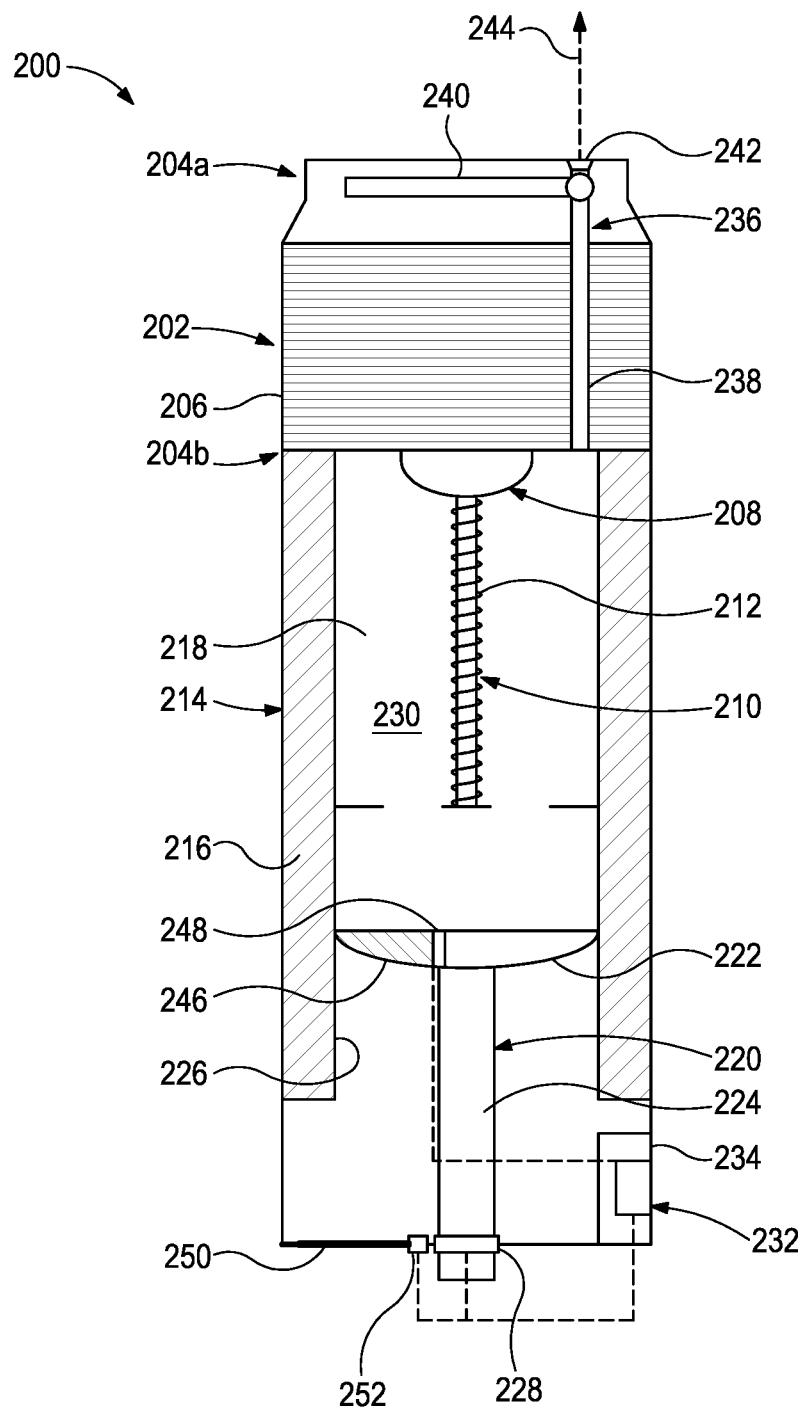
FIG. 2 is a cross-sectional side view of a smart back pressure valve, according to one or more embodiments of the present disclosure.

FIG. 2 is a cross-sectional side view of an example smart back pressure valve 200 according to one or more embodiments of the present disclosure. As illustrated, the smart back pressure valve 200 may define or include a valve body 202 having a first or "upper" end 204a and a second or "lower" end 204b opposite the upper end 204a. A plurality of threads 206 may be defined on the exterior of the valve body 202 and extend at least partially between the upper and lower ends 204a,b. The threads 206 may be configured to threadably mate with the internal threads 116 (FIGS. 1A-1B) provided by the back pressure valve profile 112 (FIG. 1A), such that the smart back pressure valve 200 may be retained within the interior channel 106 (FIGS. 1A-1B) during fluid flow. Accordingly, the smart back pressure valve 200 may be installed in pre-existing tubing hangers that utilize conventional back pressure valves without further modification.

In some embodiments, as illustrated, the valve body 202 may house a poppet assembly 208, which acts as a one-way barrier for the smart back pressure valve 200. The poppet assembly 208 may generate the one-way barrier or seal within the valve body 202 such that the flow of fluid from below (downhole from) the poppet assembly 208 is prevented. In one or more embodiments, the poppet assembly 208 may include or otherwise be mated to an actuatable valve element 210, which may be similar to the actuatable valve element 122 of FIG. 1B. The actuatable valve element 210 may include a coil spring 212 and may otherwise be spring-loaded such that flow from above may pass through the smart back pressure valve 200 if the pressure from above exceeds the spring force of the coil spring 212 and/or the actuatable valve element 210.

The actuatable valve element 210 may extend distally from the poppet assembly 208 or the valve body 202 and into a pressure testing system 214, which may be mated to or otherwise form an integral extension of the valve body 202. More specifically, the pressure testing system 214 may define or include a cylindrical pressure housing 216 extending from the lower end 204b of the valve body 202. In some embodiments, the pressure housing 216 may be attached to the valve body 202 at the lower end 204b. In such embodiments, the pressure housing 216 may be attached to the valve body 202 via at least one of threading, mechanical fasteners, welding, brazing, a mechanical connection, or any combination thereof. In other embodiments, however, the pressure housing 216 may form an integral extension of the valve body 202 and extend distally therefrom. In such embodiments, the valve body 202 and the pressure housing 216 may be made of the same material.

As illustrated, at least a portion of the actuatable valve element 210 may extend into an interior 218 of the pressure housing 216. In other embodiments, however, the poppet assembly 208 and associated actuatable valve element 210 may be housed within the interior of the valve body 202, without a departing from the scope of the disclosure.

As illustrated, the pressure testing system 214 may further include a piston 220 axially translatable within the interior 218 of the pressure housing 216 and configured to pressurize the interior 218. More specifically, the piston 220 may include a piston head 222 and a piston rod 224 extending distally from the piston head 222. The piston head 222 may be sized to form a seal (or sealed interface) with an inner wall 226 of the pressure housing 216. The piston rod 224 may be operatively coupled to a motor 228 that is actuatable and otherwise operable to drive the piston rod 224 towards and away from the valve body 202.

The interior 218 of the pressure housing 216 may be at least temporarily filled with a compressible fluid 230, such as corrosion-inhibited water. When it is desired to perform a pressure test of the smart back pressure valve 200, actuation of the motor 228 may be triggered to pressurize the interior 218 of the pressure housing 216. When operation of the motor 228 is triggered, the motor 228 drives the piston rod 224 and the piston head 222 upwards and towards the valve body 202, and as the piston 220 travels towards the valve body 202 the compressible fluid 230 will compress against the poppet assembly 208 from below.

In some embodiments, as illustrated, the motor 228 may be communicatively coupled to a control module 232, and the control module 232 may be configured to operate the motor 228. In some embodiments, the control module 232 may be attached to any portion of the pressure housing 216 or the valve body 202. In other embodiments, however, the control module 232 may be housed within a protected chamber 234 provided within or otherwise forming part of the pressure housing 216. In at least one embodiment, the protected chamber 234 may be made of a similar material as the pressure housing 216, but may define or include a fluid-tight (hermetically sealed) space for protection of the control module 232. In some embodiments, the control module 232 may be physically connected to the motor 228 via a wire, but may alternatively wirelessly communicate with the motor 228 via a wireless signal.

In some embodiments, the control module 232 may communicate with a remote control station or computer system (not shown) where an operator may be able to program or control operation of the control module 232. In such embodiments, the control module 232 may communicate with the remote control station or computer system via any wired or wireless means. In other embodiments, however, the control module 232 may be configured to operate autonomously. In such embodiments, for example, the control module 232 may include a timer programmed and otherwise set to trigger operation of the motor 228 upon expiration of a predetermined time limit. Actuating the motor 228 may advance the piston 220 and thereby pressurize the interior 218 of the pressure housing 216 when it is desired to perform a pressure test of the smart back pressure valve 200.

Once the smart back pressure valve 200 is installed in the tubing hanger 100 (FIGS. 1A-1B), the motor 228 may be actuated to pressure test the smart back pressure valve 200 from below to ensure that the valve body 202 is properly holding pressure and is properly secured within the tubing hanger 100. To accomplish this, the pressure testing system 214 may further include a pressure gauge assembly 236 operable and otherwise configured to monitor and report the pressure within the interior 218 of the pressure housing 216.

As illustrated, the pressure gauge assembly 236 may include or define a pressure tube 238 in fluid communication with the interior 218 of the pressure housing 216. In at least one embodiment, the pressure tube 238 may extend to the lower end 204b of the valve body 202 to fluidly communicate with the interior 218. The pressure tube 238 may communicate with a pressure gauge 240 secured to the valve body 202 at or near the upper end 204a. The pressure gauge 240 may be configured to monitor and measure the pressure within the interior 218 as the piston 220 is actuated and the fluid pressure within the interior 218 increases. If the fluid pressure remains stable after a predetermined time interval, that may be a positive indication that the valve body 202 is properly holding pressure and properly secured within the tubing hanger 100 (FIGS. 1A-1B). The predetermined time interval may comprise any time interval required to sufficiently monitor the pressure within the interior 218. Example predetermined time intervals include, but are not limited to 5 seconds, 10 seconds, 30 seconds, 1 minute, 5 minutes, 10 minutes, a half-hour, 1 hour, 24 hours, more than 24 hours, or any time interval subset between any of the foregoing intervals.

In some embodiments, the pressure gauge 240 may wirelessly communicate with a remote control station or computer system operated by an operator. In such embodiments, the operator may receive real-time measurements from the pressure gauge 240. In other embodiments, however, the pressure gauge assembly 236 may further include a port 242 defined in the valve body 202 and in communication with the pressure gauge 240. In such embodiments, a hydraulic line 244 may be communicably coupled to the pressure gauge 240 and extend to a remote location, such as the remote control station or the computer system, and the pressure gauge 240 may be configured to communicate the real-time pressure measurements from the interior 218 to the remote control station or the computer system via the hydraulic line 244. This may prove advantageous in being able to monitor the pressure within the interior 218 from a safe, remote distance. In at least one embodiment, the hydraulic line 244 may be extended through a "Christmas tree" of the wellhead (e.g., the Christmas tree 414 of FIG. 4) for remote pressure monitoring. In these embodiments, a running tool for installation of the smart back pressure valve 200 may further facilitate running or extension of the hydraulic line 244. As such, the running tool may remain attached to the smart back pressure valve 200 during pressure testing for active monitoring via the hydraulic line 244. Following pressure testing, the running tool and incorporated hydraulic line 244 may be detached from the smart back pressure valve 200 and returned to the surface.

Following pressure testing, the smart back pressure valve 200 may be employed as a common back pressure valve in active operation. However, when it is desired to inject the fluid through the smart back pressure valve 200, a flowpath between the valve body 202 and the bottom of the pressure housing 216 may need to be formed to enable injection operations. To accomplish this, in some embodiments, the motor 228 may be configured to retract the piston 220 within the pressure housing 216 until the piston head 222 advances past the bottom (downhole) end of the pressure housing 216. Once the piston head 222 advances past the bottom end of the pressure housing 216, a flow path around the piston 220 may be formed that allows the compressible fluid 230 within the interior 218 to drain from the interior 218, and any fluids injected downhole through the valve body 202 may flow into the interior 218 and past the piston 220 via the newly formed flow path.

Figure 3:
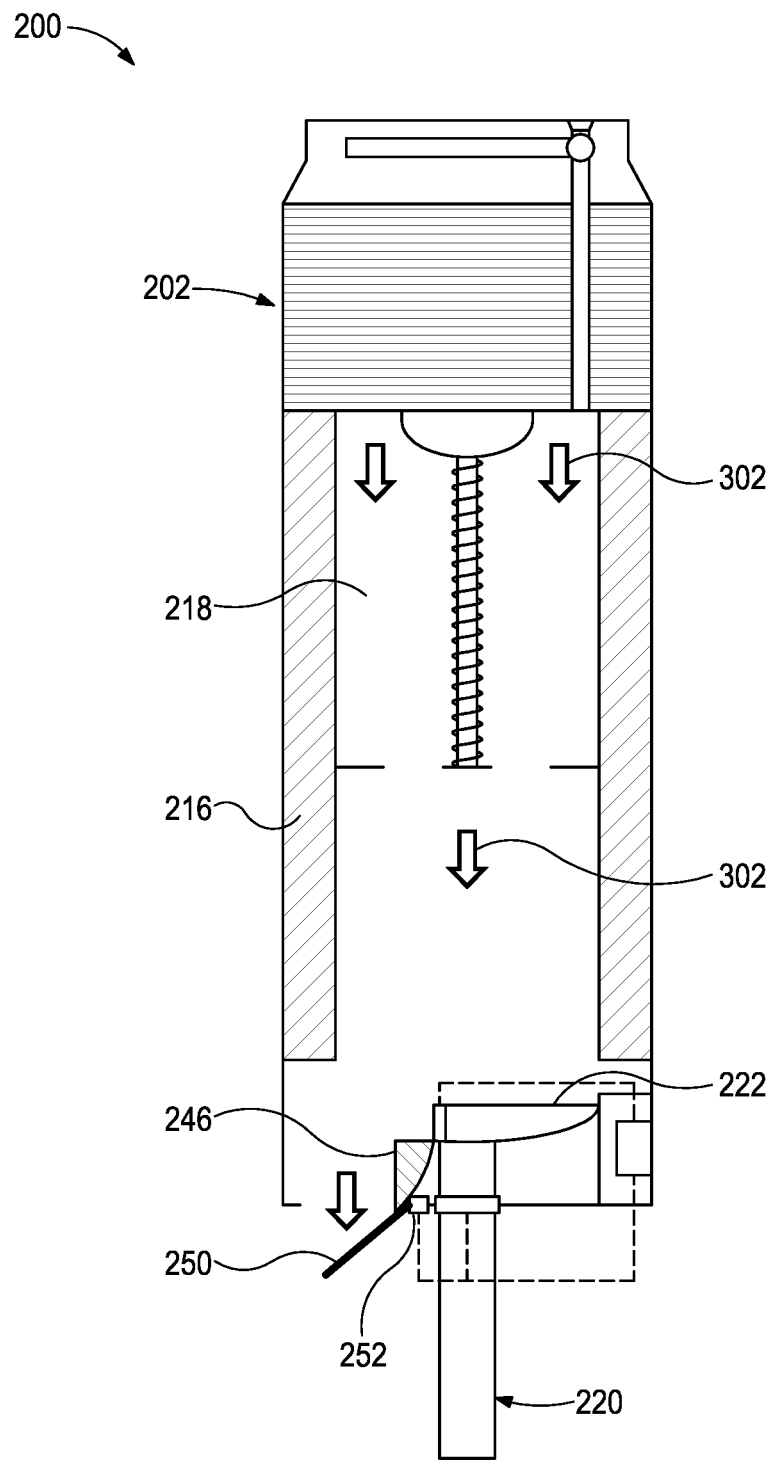
FIG. 3 is a cross-sectional side view of the smart back pressure valve following pressure testing and during operation, according to one or more embodiments of the present disclosure.

In some embodiments, however, or in addition thereto, a portion of the piston 220 may be able to be opened to allow fluid flow past the piston 220. More specifically, in some embodiments, the piston head 222 may further include a collapsible portion 246 pivotably attached to the remainder of the piston head 222. The collapsible portion 246 may be mated to or operatively coupled with a collapsing mechanism 248, which may pivotably couple the collapsible portion 246 to the remainder of the piston head 222. In some embodiments, the collapsing mechanism 248 may include an electronically actuated hinge that responds to a signal from the control module 232. In such embodiments, once the signal is received from the control module 232, the collapsing mechanism 248 may be configured to actuate and thereby allow the collapsible portion 246 to pivot from a first or "closed" state, as shown in FIG. 2, to a second or "open" state, as shown in FIG. 3. When in the closed state, the collapsible portion 246 substantially prevents fluid flow past the piston 220 in the downhole direction. In contrast, when the collapsible portion 246 transitions to the open state, fluids are able to flow past the piston 220 in the downhole direction. However, when the collapsible portion 246 transitions to the open state, the one-way barrier is still provided by the poppet assembly 208.

In other embodiments, the control module 232 may include an internal timer programmed with a preset time limit. In such embodiments, upon expiration of the preset time limit, the collapsing mechanism 248 may be actuated to move the collapsible portion 246 from the closed state to the open state. In at least one embodiment, the preset time limit may be about 30 minutes to about one hour. However, those skilled in the art will readily appreciate that the preset time limit may be less than 30 minutes or greater than an hour without departing from the scope of this disclosure.

In one or more embodiments, the collapsing mechanism 248 may comprise a pivotable hinge held in place with one or more shear pins configured to shear upon experiencing a predetermined pressure force. In such embodiments, the collapsible portion 246 may be moved from the closed state to the open state by increasing the pressure within the interior 218 through operation of the motor 228. Once the pressure within the interior 218 reaches the predetermined pressure of the shear pins, the shear pins will shear and otherwise fail, thereby allowing the collapsible portion 246 to pivot from the closed state, as shown in FIG. 2, to the open state, as shown in FIG. 3. As will be appreciated, the pressure required to shear the shear pins will be greater than the pressure used to test the smart back pressure valve 200, thus preventing the inadvertent or premature actuation of the collapsing mechanism 248.

In some embodiments, the smart back pressure valve 200 may further include a flapper valve 250 positioned at or near the bottom of the pressure housing 216. The flapper valve 250 may be movable between a first or "closed" position, as shown in FIG. 2, and a second or "open" position, as shown in FIG. 3. Movement of the flapper valve 250 may be controlled or pivoted using a pivot mechanism 252 operatively coupled to the flapper valve 250. The pivot mechanism 252 may enable pivoting of the flapper valve 250 between the closed and open positions, and thereby enable a flowpath to form through a bottom of the pressure housing 216.

In some embodiments, the pivot mechanism 252 may comprise a torsion spring configured to open the flapper valve 250 upon assuming a predetermined fluid pressure force on the flapper valve 250. In such embodiments, the pivot mechanism 252 may include one or more shear pins configured to shear or fail upon experiencing a prescribed (predetermined) pressure force, and thereby enable the pivoting of the flapper valve 250. In other embodiments, the pivot mechanism 252 may include an electronically actuated hinge which responds to a signal from the control module 232. In yet other embodiments, the control module 232 may include an internal timer programmed with a preset time limit. In such embodiments, upon expiration of the present time limit, control module 232 may send a signal to the pivot mechanism 252 to actuate the lower the flapper valve 250.

Example operation of the smart back pressure valve 200 may begin with installation of the smart back pressure valve 200 within the tubing hanger 100 (FIGS. 1A-1B) via threadably mating the plurality of threads 206 with the internal threads 116 (FIGS. 1A-1B) provided by the back pressure valve profile 112 (FIG. 1A). When it is desired to pressure test the smart back pressure valve 200, the control module 232 may send a signal to the motor 228 to begin upward motion of the piston 220 within the interior 218 and toward the valve body 202. The motor 228 may drive the piston 220 upward and thereby pressurize the compressible fluid 230 stored within the interior 218 of the pressure housing 216. The increased fluid pressure within the interior 218 may exert a corresponding pressure on the underside of the poppet assembly 208 and the valve body 202. This pressure may be measured using the pressure gauge assembly 236, which includes the pressure gauge 240. In at least one embodiment, the pressure gauge 240 may be omitted from the pressure gauge assembly 236. In these embodiments, one end of the hydraulic line 244 may be connected to the port 242 and the opposing end may be attached to an external pressure gauge on the surface. The pressure gauge assembly 236 may then facilitate external pressure monitoring via the hydraulic line 244.

Following the pressure testing and confirmation of successful installation and operation under pressure, the piston 220 may be retracted within the pressure housing 216. In some cases, the piston 220 may be retracted sufficiently within the pressure housing 216 to provide a flowpath around the piston 220. Alternatively, or in addition thereto, the collapsible portion 246 of the piston head 222 may be pivotably collapsed via the collapsing mechanism 248, as generally described above. Moreover, the flapper valve 250 may be pivoted to the open position, as also generally described above, thereby creating a flowpath between the valve body 202 and the remainder of the interior channel 106 (FIGS. 1A-1B) of the tubing hanger 100 (FIGS. 1A-1B). Any compressible fluid 230 may be circulated downhole, and the smart back pressure valve 200 may be ready for operation as a back pressure valve within the wellhead (not shown), enabling injection from above while preventing flow from the well below.

FIG. 3 is a cross-sectional side view of the smart back pressure valve 200 following pressure testing and during operation, according to one or more embodiments of the present disclosure. More specifically, FIG. 3 depicts the smart back pressure valve 200 in a flow-through orientation following pressure testing confirmation. Accordingly, FIG. 3 shows the operational orientation of the smart back pressure valve 200 during active operation, such that a flowpath is defined through the smart back pressure valve 200 to enable injection of fluids 230 from above the valve body 202.

As illustrated, the collapsible portion 246 of the piston head 222 is pivoted downward from the closed state to the open state, thereby allowing flow of injection fluids 230 from above and past the piston 220. While the illustrated embodiment depicts the collapsible portion 246 positioned at the bottom of the pressure housing 216, those skilled in the art will readily appreciate that the collapsible portion 246 would enable flow past the piston head 222 while the piston 220 is positioned within the interior 218 of the pressure housing 216.

In the illustrated embodiment, the flapper valve 250 is pivoted from the closed position to the open position by the pivot mechanism 252, thus placing the interior of the smart back pressure valve 200 in fluid communication with the remainder of the interior channel 106 (FIGS. 1A-1B) of the tubing hanger 100 (FIGS. 1A-1B). As such, the injection fluid 302 may pass through the valve body 202, through the interior 218 of the pressure housing 216, and past the flapper valve 250 to exit the smart back pressure valve 200 while simultaneously preventing upward flow of formation fluids (not shown) during active operation.

Figure 4:
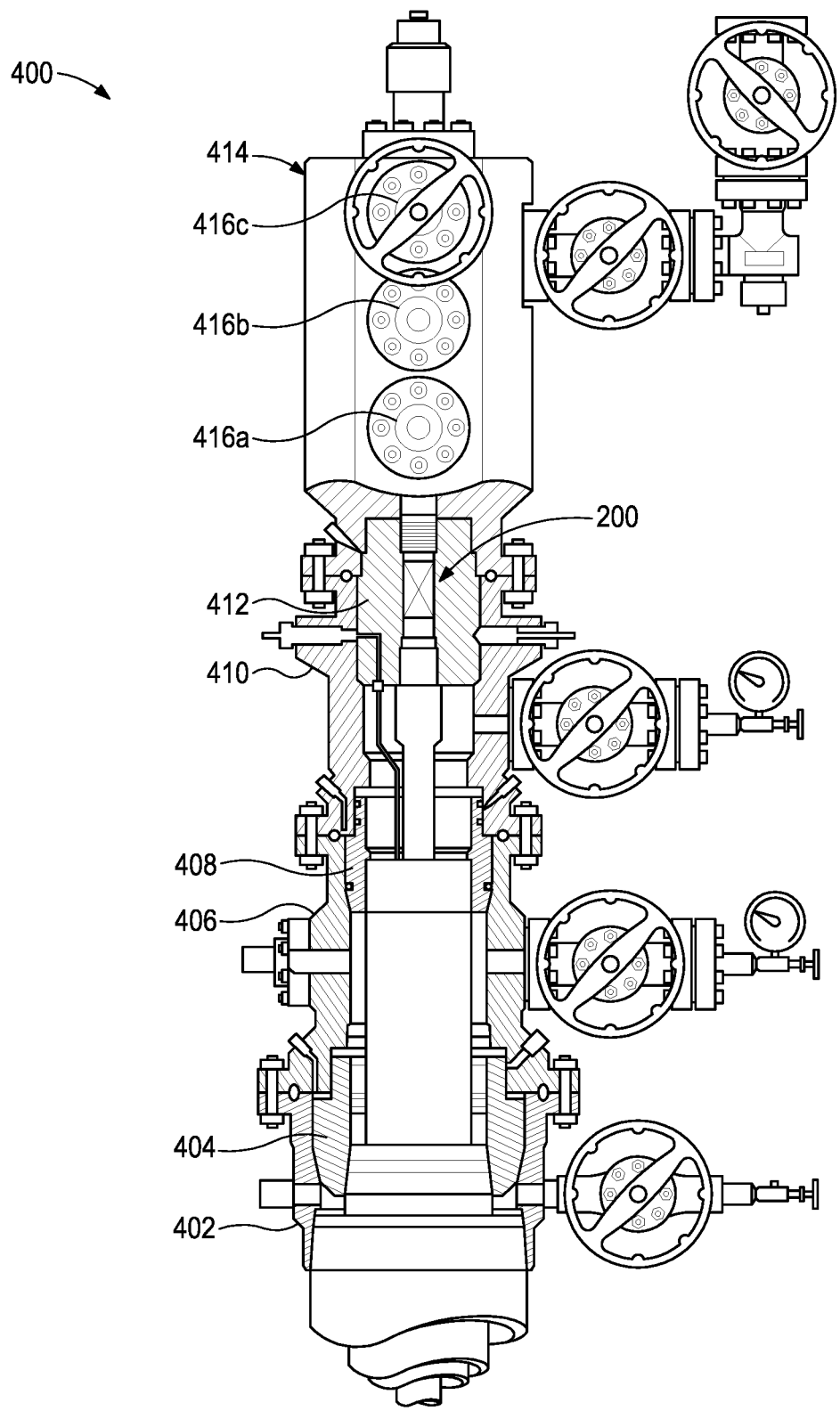
FIG. 4 is an example wellhead that may incorporate the principles of the present disclosure.

FIG. 4 is an example wellhead 400 that may incorporate the principles of the present disclosure. While the wellhead 400 shown in FIG. 4 includes specific components, those skilled in the art will readily appreciate that the wellhead 400 may alternatively include other components or tools, without departing from the scope of the disclosure. As illustrated, the wellhead 400 includes a casing head housing 402 with a casing hanger 404 secured therein. The wellhead 400 may further include a casing head 406 secured to the top of the casing head housing 402, and a casing hanger 408 may be secured within the casing head housing 406. The wellhead 400 may also include a tubing head adapter 410 secured to the top of the casing head housing 406, and a tubing hanger 412 may be secured within the tubing adapter 410. A production tree (or "Christmas tree") 414 may be attached to the top of the tubing head adapter 410, and may include a plurality of valves, such as a lower master valve 416a, and upper master valve 416b, and a swab valve 416c.

The tubing hanger 412 may be the same as or similar to the tubing hanger 100 of FIGS. 1A-1B. In the illustrated embodiment, the smart back pressure valve 200, as generally described herein, is secured within the tubing hanger 412 and is able to operate as generally described above.

Figure 5:
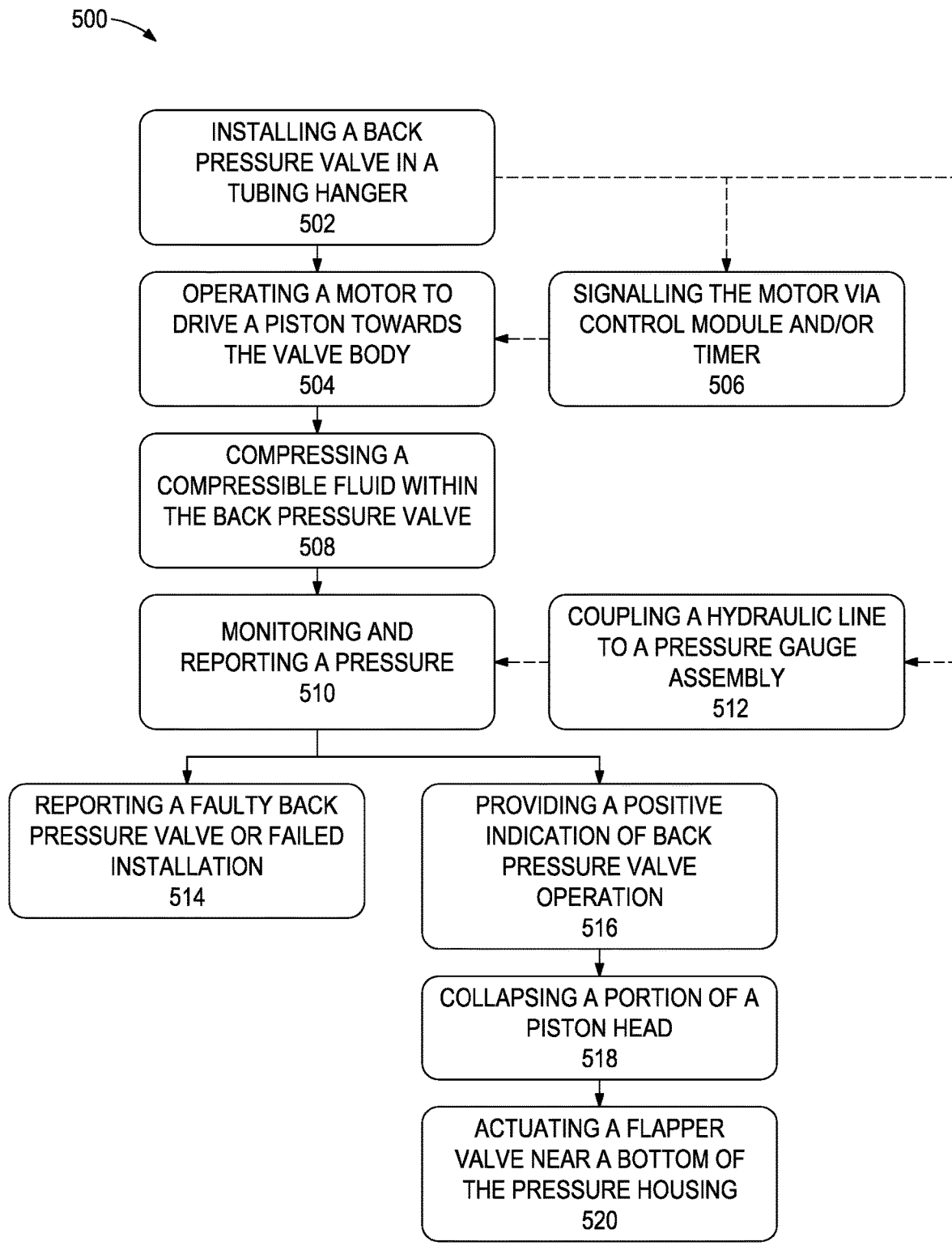
FIG. 5 is a schematic flowchart of an example method for installing and testing a back pressure valve within a tubing hanger of a wellhead.

FIG. 5 is a schematic flowchart of an example method 500 for installing and testing a back pressure valve (e.g., the smart back pressure valve 200 of FIGS. 2-3) within a tubing hanger of a wellhead. The method 500 may begin at 502 with installing a back pressure valve within a tubing hanger (e.g., the tubing hanger 100 of FIGS. 1A-1B) of a wellhead (e.g., the wellhead 400 of FIG. 4). At 504, a motor within the back pressure valve (e.g., the motor 228 of FIG. 2) may begin operating to drive a piston (e.g., the piston 220 of FIG. 2) towards the valve body (e.g., the valve body 202 of FIG. 2). In at least one embodiment, the motor may be signaled via a control module (e.g., the control module 232 of FIG. 2) and/or a timer, as at 506. The control module or timer may provide a signal for operation of the motor, such that the motor will only operate once conditions have been met, such as the expiration of a predetermined time interval following installation.

At 508, as the motor drives the piston towards the valve body, a compressible fluid (e.g., the compressible fluid 230 of FIG. 2) within the back pressure valve is compressed by the piston. Compression of the compressible fluid at 508 may increase pressure within the back pressure valve, and particularly within a pressure housing (e.g., the pressure housing 216 of FIG. 2) below a poppet assembly (e.g., the poppet assembly 208 of FIG. 2). As such, the integrity of the poppet assembly and back pressure valve may be tested from below while installed within the tubing hanger of the wellhead. Accordingly, at 510 a pressure is monitored and reported within the back pressure valve via a pressure gauge assembly (e.g., the pressure gauge assembly 236 of FIG. 2). In at least one embodiment of the present disclosure, at 512 a hydraulic line (e.g., the hydraulic line 244 of FIG. 2) may be coupled to the pressure gauge assembly and run to a remote location, such that monitoring and reporting of the pressure may be remotely performed.

At 514, if the monitoring and reporting of the pressure indicated an issue, the method 500 may include reporting a faulty back pressure valve or a failed installation of the back pressure valve, such that attention or maintenance may be required prior to operation. Conversely, if the monitoring and reporting of the pressure indicated no issues, the method 500 may include providing a positive indication of back pressure valve operation and installation at 516. The positive indication of back pressure valve operation and installation at 516 may be determined following a predetermined time interval, such that operation of the back pressure valve may be confirmed after a duration under pressure. At 518, a collapsible portion (e.g., the collapsible portion 246 of FIG. 2) of the piston head (e.g., the piston head 222 of FIG. 2) may be collapsed to enable the compressible fluid to flow past the piston head and piston. The collapsible portion may be collapsed following shearing of one or more shear pins included in the collapsible portion, and configured to shear upon experiencing a predetermined pressure force. At 520, a flapper valve (e.g., the flapper valve 250 of FIG. 2) positioned at or near a bottom of the pressure housing may actuate, and may place the back pressure valve in fluid communication with the tubing hanger and any tubing below. As such, actuating the flapper valve at 520 may further include releasing the compressible fluid from the back pressure valve through the flapper valve.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation used herein are merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, if used herein, the terms "coupled" or "coupled to" or "connected" or "connected to" or "attached" or "attached to" may indicate establishing either a direct or indirect connection, and is not limited to either unless expressly referenced as such.

The use of directional terms such as above, below, upper, lower, upward, downward, left, right, uphole, downhole and the like are used in relation to the illustrative embodiments as they are depicted in the figures, the upward direction being toward the top of the corresponding figure and the downward direction being toward the bottom of the corresponding figure, the uphole direction being toward the surface of the well and the downhole direction being toward the toe of the well.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

The invention claimed is:

1. A back pressure valve, comprising:
   a valve body having opposing upper and lower ends; and
   a pressure testing system extending from the lower end of the valve body and providing:
      a pressure housing defining an interior at least partially filled with a compressible fluid;
      a piston axially translatable within the interior and including a piston head that forms a seal against an inner wall of the pressure housing, and a piston rod extending distally from the piston head;
      a motor operatively coupled to the piston rod and operable to drive the piston toward and away from the valve body; and
      a pressure gauge assembly configured to monitor and report a pressure within the interior,
   wherein, as the motor advances within the interior, the compressible fluid is compressed and the pressure within the interior increases, and
   wherein, the pressure gauge assembly reporting that the pressure stabilizes after a predetermined time interval is a positive indication that the valve body properly holds pressure.

2. The back pressure valve of claim 1, further comprising a control module communicably coupled to the motor and programmed to operate the motor.

3. The back pressure valve of claim 2, wherein the control module is housed within a hermetically sealed protected chamber provided within the pressure housing.

4. The back pressure valve of claim 2, wherein the control module includes a timer programmed to trigger operation of the motor upon expiration of a predetermined time limit.

5. The back pressure valve of claim 1, wherein the pressure gauge assembly includes:
   a pressure tube in fluid communication with the interior; and
   a pressure gauge in communication with the pressure tube and configured to measure the pressure within the interior.

6. The back pressure valve of claim 5, wherein the pressure gauge assembly further includes:
   a port defined in the valve body and in communication with the pressure gauge; and
   a hydraulic line communicably coupled to the pressure gauge and extending to a remote location to communicate real-time pressure measurements of the interior.

7. The back pressure valve of claim 1, wherein the piston head includes a collapsible portion pivotably attached to a remainder of the piston head.

8. The back pressure valve of claim 7, wherein the collapsible portion is pivotably attached with a collapsing mechanism comprising a pivotable hinge held in place with one or more shear pins configured to shear upon experiencing a predetermined pressure force.

9. The back pressure valve of claim 1, further comprising a flapper valve positioned at or near a bottom of the pressure housing.

10. The back pressure valve of claim 1, wherein the pressure gauge assembly is in communication with a remote location to communicate real-time pressure measurements of the interior.

11. The back pressure valve of claim 10, wherein the pressure gauge assembly provides the positive indication to the remote location indicating that the valve body does not enable backflow therethrough if the real-time pressure measurement does not decrease after a predetermined time interval.

12. A method of testing a back pressure valve, comprising:
  installing the back pressure valve in a tubing hanger of a wellhead, the back pressure valve including a valve body having opposing upper and lower ends, and a pressure testing system extending from the lower end of the valve body, the pressure testing system providing:
    a pressure housing defining an interior at least partially filled with a compressible fluid;
    a piston axially translatable within the interior and including a piston head that forms a seal against an inner wall of the pressure housing, and a piston rod extending distally from the piston head;
    a motor operatively coupled to the piston rod; and
    a pressure gauge assembly,
  operating the motor and thereby driving the piston toward the valve body;
  compressing the compressible fluid within the interior as the piston moves toward the valve body;
  monitoring and reporting a pressure within the interior with the pressure gauge assembly; and
  determining that the valve body properly holds pressure when the pressure gauge assembly reports that the pressure stabilizes after a predetermined time interval.

13. The method of claim 12, wherein the motor is communicably coupled to a control module housed within a hermetically sealed protected chamber provided within the pressure housing, the method further comprising sending a signal to the motor with the control module to begin operation of the motor.

14. The method of claim 13, wherein the control module includes a timer and sending the signal comprises:
  programming the timer with a predetermined time limit; and
  sending the signal upon expiration of the predetermined time limit.

15. The method of claim 12, further comprising coupling a hydraulic line to the pressure gauge assembly, wherein the hydraulic line extends to a remote location for monitoring and reporting the pressure within the interior with the pressure gauge assembly.

16. The method of claim 12, further comprising:
  collapsing a collapsible portion of the piston head pivotably attached to a remainder of the piston head;
  actuating a flapper valve positioned at or near a bottom of the pressure housing; and
  releasing the compressible fluid from the back pressure valve through the flapper valve.

17. The method of claim 16, wherein collapsing the collapsible portion of the piston head comprises shearing one or more shear pins configured to shear upon experiencing a predetermined pressure force.

18. The method of claim 12, further comprising providing the positive indication to a remote location in communication with the pressure gauge assembly if the pressure gauge assembly reports that the pressure does not decrease after a predetermined time interval, the positive indication indicating that the valve body does not enable backflow therethrough.

* * * * *